July 7, 1942.    J. H. FRIDEN    2,288,617
COLLAPSIBLE TUBE APPARATUS
Filed Feb. 3, 1938    10 Sheets-Sheet 1

INVENTOR:
John H. Friden
BY
His ATTORNEY

July 7, 1942. J. H. FRIDEN 2,288,617
COLLAPSIBLE TUBE APPARATUS
Filed Feb. 3, 1938 10 Sheets-Sheet 2

Fig. 3.

INVENTOR:
John H. Friden
BY
H. C. Diesem
his ATTORNEY.

July 7, 1942.　　　J. H. FRIDEN　　　2,288,617
COLLAPSIBLE TUBE APPARATUS
Filed Feb. 3, 1938　　10 Sheets-Sheet 3

INVENTOR:
John H. Friden
BY H. C. Diserens
his ATTORNEY.

July 7, 1942. J. H. FRIDEN 2,288,617
COLLAPSIBLE TUBE APPARATUS
Filed Feb. 3, 1938 10 Sheets-Sheet 8

INVENTOR:
John H. Fridén
BY
H. C. Diserens
his ATTORNEY.

July 7, 1942.  J. H. FRIDEN  2,288,617
COLLAPSIBLE TUBE APPARATUS
Filed Feb. 3, 1938   10 Sheets-Sheet 9

INVENTOR:
John H. Fridén
BY
his ATTORNEY

July 7, 1942. J. H. FRIDEN 2,288,617
COLLAPSIBLE TUBE APPARATUS
Filed Feb. 3, 1938 10 Sheets-Sheet 10

INVENTOR:
John H. Friden
BY
his ATTORNEY.

Patented July 7, 1942

2,288,617

UNITED STATES PATENT OFFICE 2,288,617

COLLAPSIBLE TUBE APPARATUS

John H. Fridén, Maplewood, N. J., assignor to The Sun Tube Corporation, Hillside, N. J., a corporation of New Jersey Application February 3, 1938, Serial No. 188,418

13 Claims. (Cl. 91—16)

The invention relates to apparatus for the manufacture of collapsible metal tubes, and more particularly to the handling of coated tubes during the subsequent steps of drying and printing.

In the manufacture of decorated collapsible metal tubes of the sort commonly used as containers for toothpaste, shaving cream, and the like, the tubes issuing from the extrusion machines are trimmed, threaded, and an initial or base coating of color applied to the exterior walls thereof. Following application of the base coating the tubes pass through a dryer to harden the coating and condition it to receive the further decoration which is to be applied by the printing unit. Thus the tubes issuing from the color unit are placed upon a conveyor which carries them through the dryer to the printing unit, or to the first printing unit if there is more than one printing step to be performed.

The conveyor chain used to carry the coated tubes through the dryer takes up a large amount of heat from the dryer, and, passing out the other side dissipates this heat to the atmosphere. This dissipation of heat is very considerable and the loss occasioned thereby must be made up by supplying additional heat to the dryer. It is an object of the present invention to minimize this loss, to which end I have provided an arrangement wherein the output of two or more color units (or "stations" as hereinafter defined) are carried in a single continuous series on one conveyor chain through the dryer. Upon leaving the dryer this series of coated tubes is conveyed to two or more printing stations, means being provided for removing certain of the tubes at each.

For convenience of reference I shall reserve the term "unit" to designate mechanism for performing any single operation such as coloring or printing. Each unit may comprise two or more separate machines or stations, and such units will be designated herein as "multiple station" units.

By the arrangement wherein the ouput of multiple stations of a color unit are carried in a single series on one conveyor chain through the dryer and delivered at multiple stations of a printing unit, it is possible to utilize the full capacity of the conveyor with resulting economy in heat as well as economy in floor space for the complete installation.

A further object of my invention is to provide apparatus for selectively removing from the conveyor the coated tubes delivered from the dryer so that certain of the tubes are removed at one station of a printing unit, others of the tubes removed at a second station of the unit, and so on if there be more than two stations.

Another object is to provide means for such selective removal in combination with means for reversing the position of the tubes for application to the spindle or spindles of a printing machine, wherein the selective removing mechanism cooperates with the reversing mechanism to assist in reversing the positions of the tubes.

A further object is to provide selective removing and reversing mechanism in combination with means for applying the coated tubes to the spindles of a printing machine, wherein the tube-applying means is associated with the spindle-supporting member in such a manner as to permit adjustment of the latter to align the spindles with the surface of an impression blanket on the printing roll without disturbing alignment between the tube-applying means and the spindles. Additional objects and advantages will appear as the description proceeds.

In the drawings,

Figs. 10 to 13, inclusive, show the selective tube-removing and reversing mechanism, Fig. 10 being a side elevational view partly in section taken as viewed from the right of Fig. 5; Fig. 11, a sectional view taken on the line XI—XI of Fig. 10.

Figs. 14 to 17, inclusive, are detail views showing the tube-supporting carriage used in mounting the coated tubes on the printing machine spindles and the means for spacing the carriage from the spindles to separate them by an amount equal to the wall thickness of the coated tubes.

Figures 1, 2:
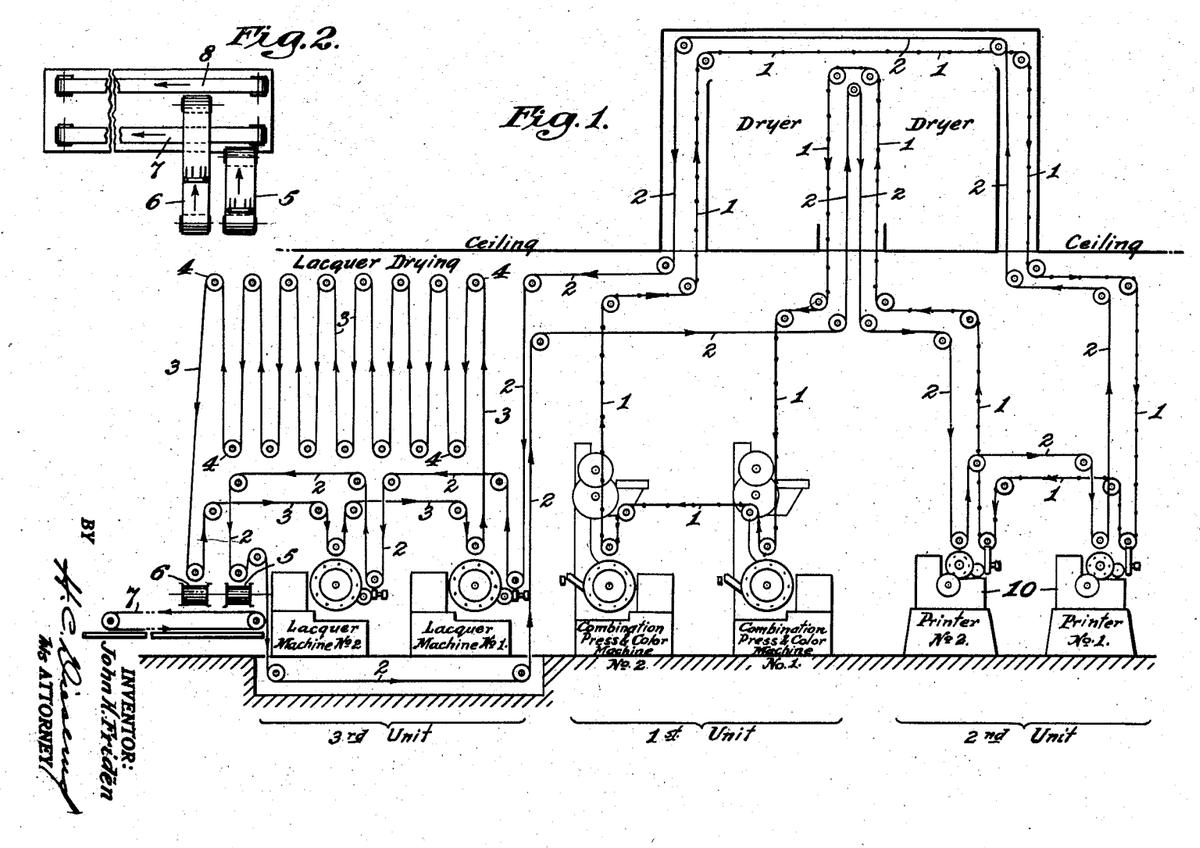
Fig. 1 is a diagrammatic representation of a production line comprising a series of multiple-station processing units showing an arrangement whereby it is possible to utilize the full capacity of a heated conveyor chain.
Fig. 2 is a diagrammatic plan view of the mechanism for transferring the decorated tubes following the printing and lacquering operations.

Referring to Fig. 1, there is shown in diagrammatic form a production layout comprising a series of multiple station processing units. In the embodiment illustrated there are three such units, each consisting of two machines or stations. The first unit is represented as consisting of two combination press and color machines, designated "No. 1" and "No. 2." The second unit comprises two printing stations designated "Printer No. 1" and "Printer No. 2." If the base-coated and printed tubes are to be lacquered there may also be provided a third unit, and such a unit consisting of two stations designated "Lacquer machine No. 1" and "Lacquer machine No. 2" has been included in the layout shown. Located preferably on the floor above is a "Dryer" which may be of the form shown in my copending application Serial No. 11,283.

A conveyor chain or belt 1 runs successively past the two stations of the color unit, through the dryer and therebeyond past the two stations of the printing unit, after which it proceeds back to the starting point. A second conveyor chain or belt 2 runs successively past the two stations of the printing unit, then through the dryer and therebeyond past the two stations of the lacquer unit. A third conveyor chain or belt 3 runs successively past each station of the lacquer unit, through another dryer which, as shown, consists of a series of sprockets 4 over which the chain 3 passes in a circuitous path to air-dry the lacquered tubes. Below the terminus of the conveyor chain 2 there may be provided a conveyor belt 5 and below the terminus of the conveyor chain 3 a similar belt 6 leading respectively to belts 7 and 8, passing to or over an inspection and packing table (Fig. 2).

The conveyor chains 1, 2 and 3 provide means for supporting the collapsible metal tubes during their travel from station to station of each unit, and from unit to dryer to unit. In the preferred embodiment illustrated, this supporting means consists of a series of spaced projections in the form of pins extending laterally from the conveyor chains. In the operation of the layout shown in Fig. 1 the operator at the first station of the color unit places over the supporting pins of conveyor chain 1 the base-coated tubes which are delivered to him from the color machine. If there are two stations, he places the tubes on every other pin and the operator at the second station places the base-coated tubes delivered to him from the second color machine on the remaining pins of conveyor chain 1. If there are three stations, the tubes are placed on every third pin, and so on. In this manner the coated tubes delivered at the multiple stations of the color unit are carried by the conveyor chain 1 in a continuous series which permits the conveyor to be loaded to its full capacity as determined with respect to the speed of the conveyor and the capacity of the dryer.

At each station of the printing unit there is provided automatic means for selectively removing the coated tubes from the conveyor 1 and also means for reversing the tubes for application to the spindles of the printing machines. In the layout shown, the selective removing means is arranged to remove every other tube at the first station and the remaining tubes at the second station.

Upon completion of the printing operation the tubes are removed from the spindles of the printing machines and placed upon pins carried by the conveyor chain 2. Here again the tubes from the first machine are placed upon every other supporting pin and the tubes from the second machine placed upon the remaining pins. The conveyor chain 2 carries the tubes from the printing unit through the dryer to the lacquering unit. The conveyor chain 2 passes successively each station of the lacquering unit permitting the tubes to be removed at those stations. When there are two stations as shown, every other tube is removed at the first station and the remaining tubes at the second station. After lacquering, the tubes are then placed in similar alternating fashion on the conveyor chain 3 which carries them in a circuitous path over the sprockets 4 to air-dry the lacquer coating. From the air dryer the tubes pass over the conveyor belt 6, to which they are transferred, to be carried to the inspecting and packaging station. If the tubes are not to be lacquered they simply pass on with the conveyor chain 2, by-passing the lacquering stations, until they reach a position above the conveyor belt 5 where they are removed for transfer to the inspecting and packaging station.

Figures 10, 11:
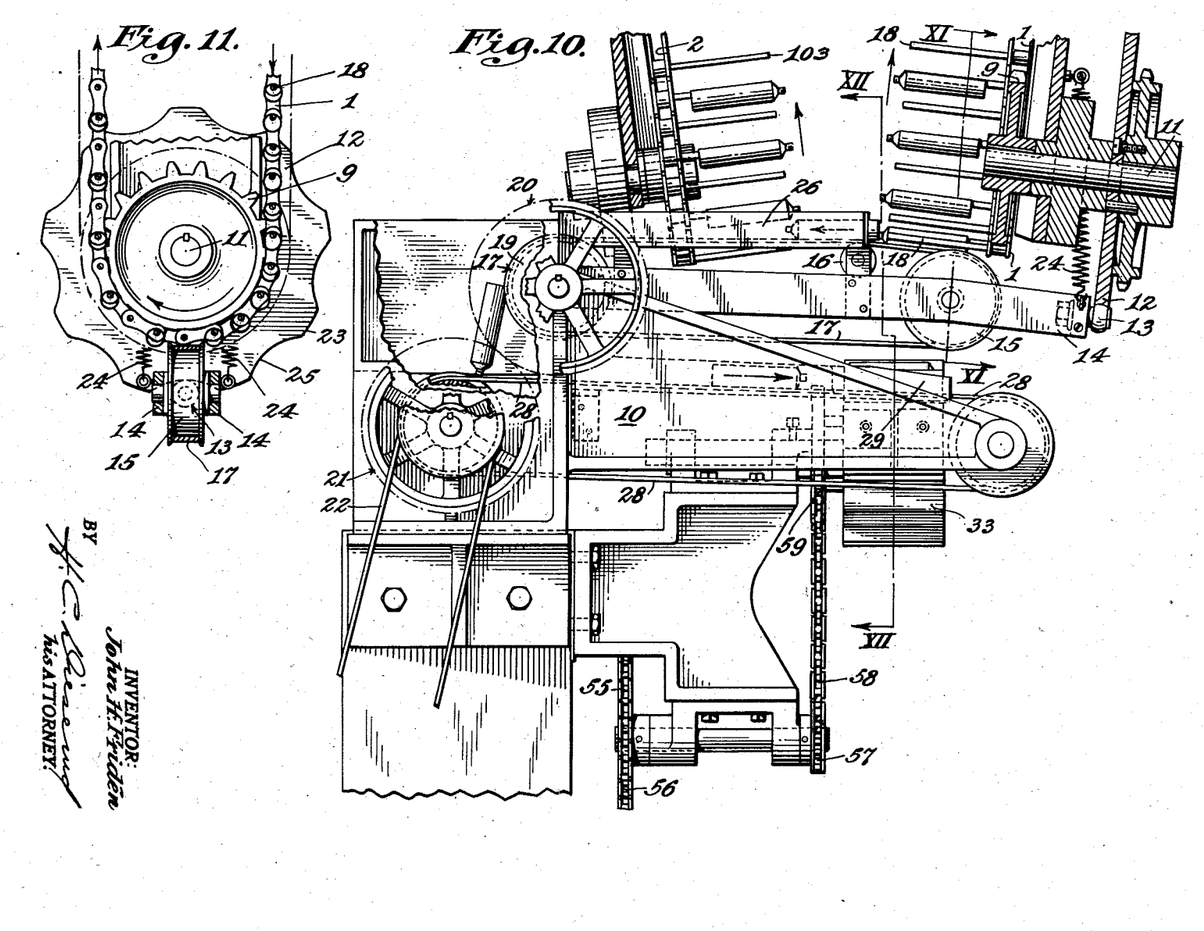

The mechanism for selectively removing the tubes from the conveyor chain 1 at each station of the printing unit will now be described with reference to Figs. 3 to 6 inclusive, Fig. 10 and Fig. 11. These views depict a printing machine with associated mechanism including the conveyor chains 1 and 2 (Fig. 10) and means for selectively removing tubes from the pins of conveyor 1. With particular reference to Figs. 10 and 11 there is shown that portion of conveyor chain 1 which passes over a sprocket 9 mounted above the printing machine 10 which comprises one station of the printing unit. The sprocket 9 is keyed to a shaft 11 carried by the conveyor supporting frame to which shaft also is keyed a cam 12. The cam 12 coacts with a cam roller 13 mounted at one end of a rockable conveyor belt support 14. Mounted on the support 14 are pulleys 15 and 16 over which passes the belt 17, the pulleys 15 and 16 being so positioned that the belt 17 passes below the path of travel of the tube-supporting pins 18 of the conveyor chain 1 in a direction parallel to the axis of the pins. The belt 17 passes over the driven pulley 19 which is actuated by any suitable mechanism such as the gear wheels 20, 21, the latter of which in the machine illustrated is driven by a belt 22 which passes over a pulley keyed to the same shaft as the gear 21 and is driven by a motor (not shown) in the base of the machine.

The cam 12 is so designed that the raised portions 23 thereof serve to hold the belt 17 in spaced relationship to the tubes carried by the supporting pins 18 toward which the belt support 14 is urged by springs 24 secured at one end to the supporting structure for the conveyor 1 and at the other end to the rockable conveyor belt support 14. When the cam roller 13 passes from the raised portions 23 to the valleys 25 of the cam, the belt support 14 is permitted to move upwardly under the action of the springs 24, bringing the belt 17 into engagement with the lower surface of the tube carried by the conveyor pin 18 directly thereabove. This action raises the tube from the pin 18 sufficiently to release it therefrom so that the tube is then carried to the left as viewed in Fig. 10 through the trough 26 where it falls over the end of the belt 17 as it passes around the driven pulley 19. The spacing of the crests 23 and valleys 25 of the cam 12 is such that the conveyor belt 17 is brought into engagement with only every other tube carried by the conveyor chain 1 (assuming that the printer is a two-station unit). From the end of the belt 17 the leading end of the tube drops onto a second conveyor belt 28 which projects beyond the end of the upper belt, and is driven by a pulley keyed to the same shaft as the gear wheel 21, the belt 28 moving in a direction opposite to that of the belt 17. The belt 28 carries the leading end of the tube in the opposite direction, causing the tube to fall onto the belt 28 in a reversed position.

Figure 3:
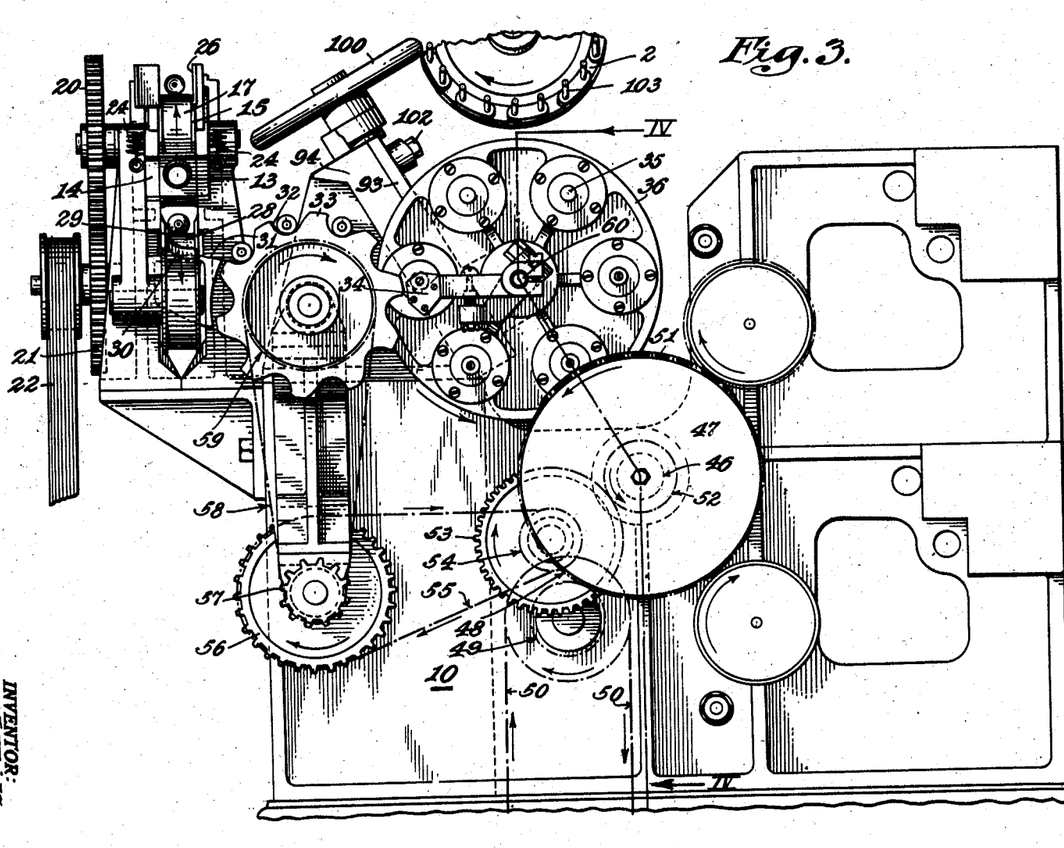
Fig. 3 is a front elevational view of a printing machine constituting one station of a printing unit.
Figure 12:
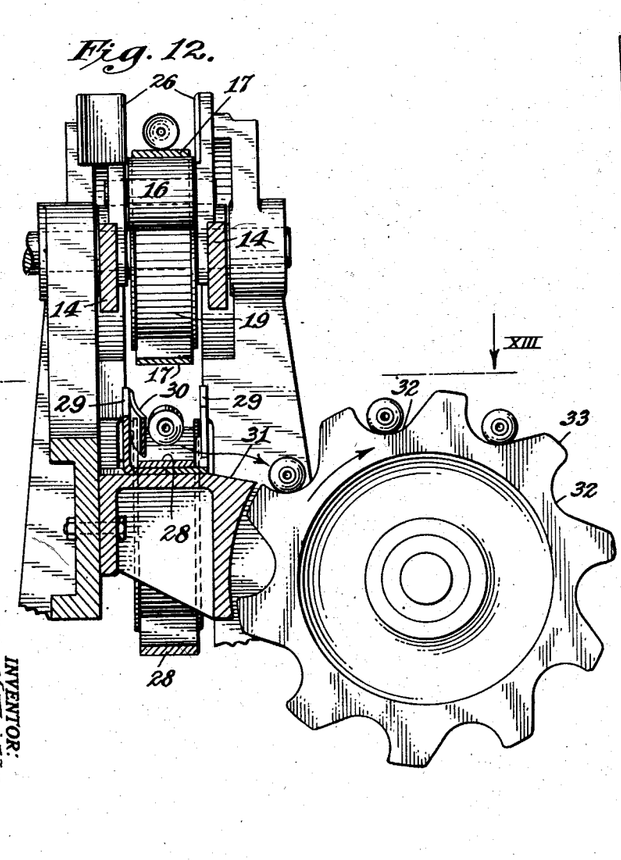
Fig. 12, a transverse sectional view to an enlarged scale on the line XII—XII of Fig. 10.
Figure 13:
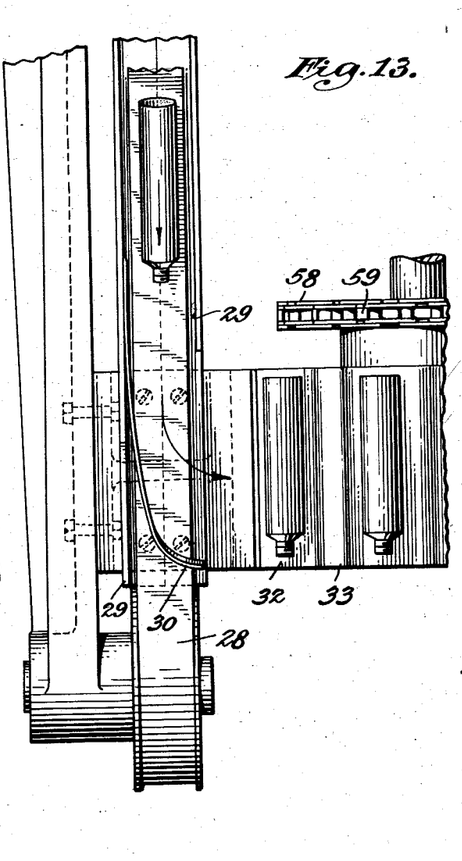
Fig. 13, a sectional view on the line XIII—XIII of Fig. 12.
Figure 14:
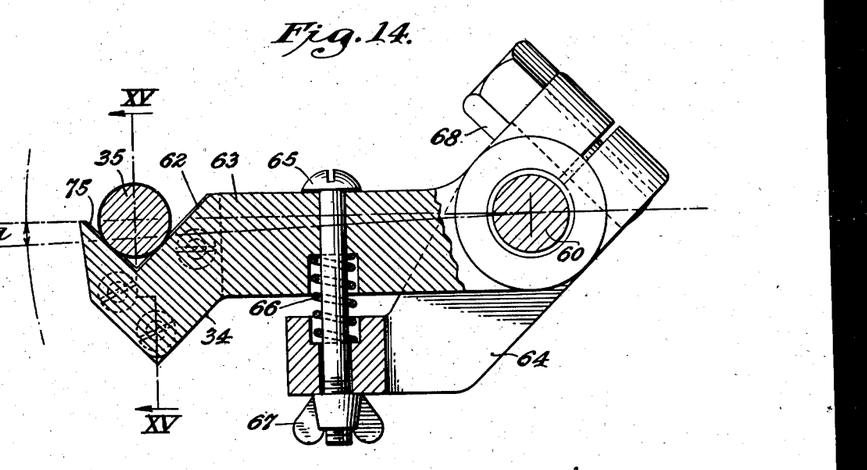
Fig. 14 is an enlarged transverse sectional view taken on the line XIV—XIV of Fig. 6.
Figure 15:
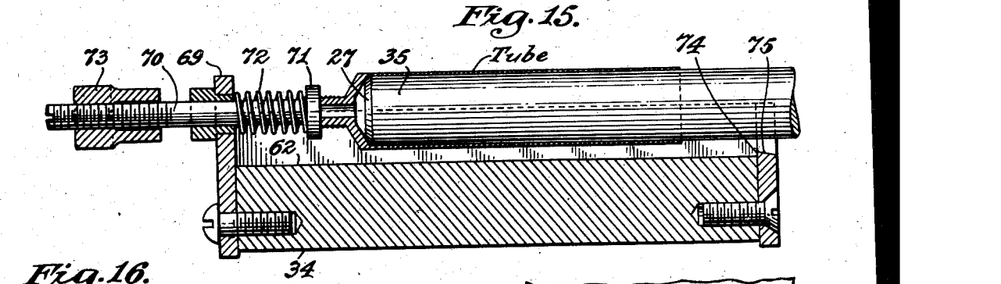
Fig. 15 is a longitudinal sectional view on the line XV—XV of Fig. 14.

Referring now more particularly to Figs. 3, 6, 12, and 13 I shall describe the transfer of the tubes from the belt 28 to the carriage which is used to apply them to the spindles of the printing machines. The belt 28 carries the tubes in reversed position and direction through the trough 29 one side of which is curved over the top of the belt at 30 to cause the tube to roll laterally off of the belt down the inclined surface 31 into pockets 32 of a feed wheel 33, which as viewed in Figs. 3 and 12 is arranged for rotation in a clockwise direction to deliver the tubes successively to a carriage 34 for application to spindles 35 mounted on the turret 36 of the printing machine.

Figure 4:
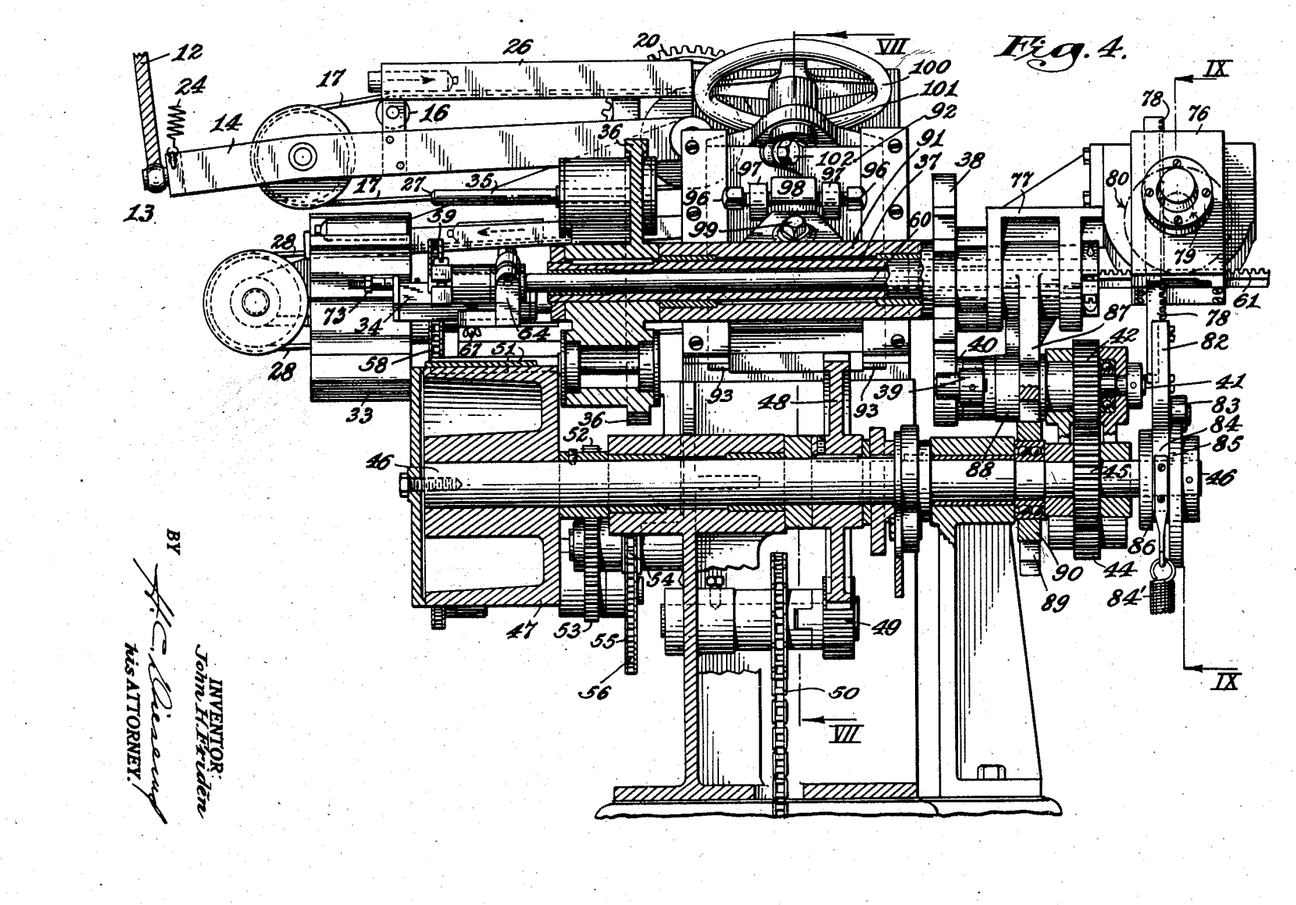
Fig. 4 is a vertical longitudinal sectional view taken on the line IV—IV of Fig. 3.

The turret 36 is keyed to a hollow shaft 37 (Fig. 4) to which also is secured a Geneva wheel 38 actuated by the roller arm 39 and locking disc 40 Fig. 4) to produce intermittent rotation of the turret in a counterclockwise direction as viewed in Fig. 3. The roller arm 39 and locking disc 40 are driven by a shaft 41 which is driven by a gear train 42, 43, 44 from a pinion 45 keyed to a shaft 46 which carries the printing roll 47. The shaft 46 is driven in turn by a gear wheel 48 meshing with a pinion 49 driven by a chain 50 actuated from a source of power (not shown). The gear train 42, 43, 44 provides a flexible drive between shafts 37 and 46 permitting lateral adjustment between the two shafts to be effected by means which will be described. Mounted on the printing roll 47 is an impression blanket 51 to which ink is applied by the usual ink rolls or other means not forming a part of the present invention. The feed wheel 33 previously referred to likewise is driven from the shaft 46 through a reducing chain-gear drive 52, 53, 54, 55, 56, 57, 58, 59.

The tube carriage 34 is mounted on a rod 60 which passes through the center of the hollow shaft 37. On the squared end of the rod 60 is formed a rack 61 with which is associated mechanism driven from the shaft 46 for moving the rod 60 in a direction parallel with its axis which is parallel with the axes of the spindles 35 on the turret 36. This mechanism, which later will be described in more detail, also provides means for causing the rod 60 to oscillate, providing a fixed pivot for the carriage 34 at the axis of the turret 36.

Figures 16, 17:
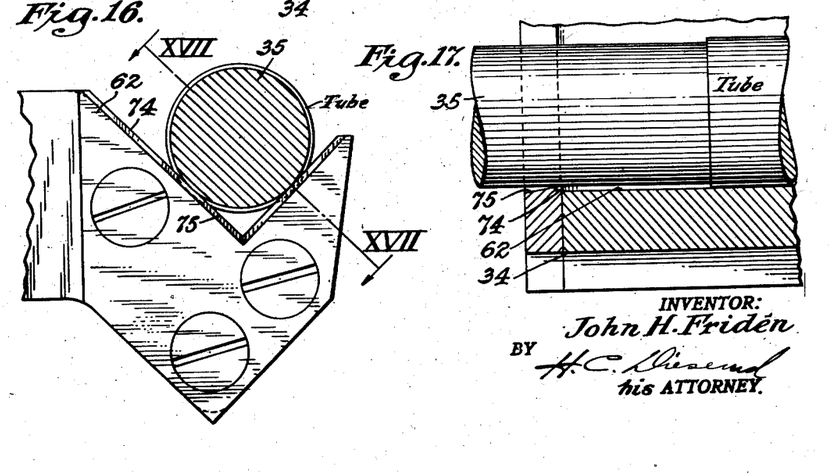
Fig. 16 is an enlarged view of the mechanism shown in Fig. 15 taken as viewed from the right of that figure.
Fig. 17 is a sectional view taken on the line XVII—XVII of Fig. 16.

The tube carriage 34 is shown in Figs. 14 to 17 inclusive. It consists essentially of a trough 62 carried by an arm 63 which is rotatably mounted on the rod 60 and is secured to an adapter arm 64 by a bolt 65. Surrounding the bolt 65 is a compression coil spring 66 urging apart the two arms 63 and 64, the normal position of the arms relative to each other being adjustable by means of the wing nut 67. The arm 64 is rigidly secured to the rod 60 by a screw 68. The outer end of the trough 62 is provided with an end wall 69 through which passes a slidable plunger 70 having at one end a collar 71 arranged to bear against the cap end of a tube carried by the trough. Between the end wall 69 and the collar 71 is disposed a compression coil spring 72, and the plunger 70 carries at its other end an adjustable stop nut 73 which serves to limit the movement of the plunger under the action of the spring 72. The trough 62 is provided at its inner end with a shoulder 74 which, as will be seen from Figs. 16 and 17, is of a height substantially equal to the thickness of a tube carried by the spindle 35. Shoulder 74 is preferably tapered at 75 for cooperation with the ends of the spindles 35. Thus the shoulder 74 serves as a "feeler" so that when the adapter arm 64 is rotated in a clockwise direction as viewed in Fig. 14 to bring a tube into position for placement upon one of the spindles 35, and the carriage 34 advanced toward the spindle 35, the tapered portion 75 of the shoulder 74 engages the end of the spindle causing the arm 63 which carries the trough 62 to rotate in a counterclockwise direction by an amount sufficient to permit the shoulder 74 to ride along the spindle 35. This counterclockwise rotation of the arm 63 is effected against the action of the compression spring 66 so that there is thus provided a resilient means which in conjunction with the "feeler" shoulder 74 serves to accurately align the trough 62 with a spindle 35 during the application of a tube thereto. When the shoulder 74 is in contact with the spindle 35 the latter is spaced from the body of the trough 62 by an amount approximately equal to the wall thickness of the tube carried therein. After a tube has been applied to a spindle 35 in the manner indicated the rod 60 is caused to rotate through a very small angle in a counterclockwise direction as viewed in Fig. 14 to free the tube completely from the trough 62 prior to translation of the trough to the left as viewed in Fig. 15.

Figure 5:
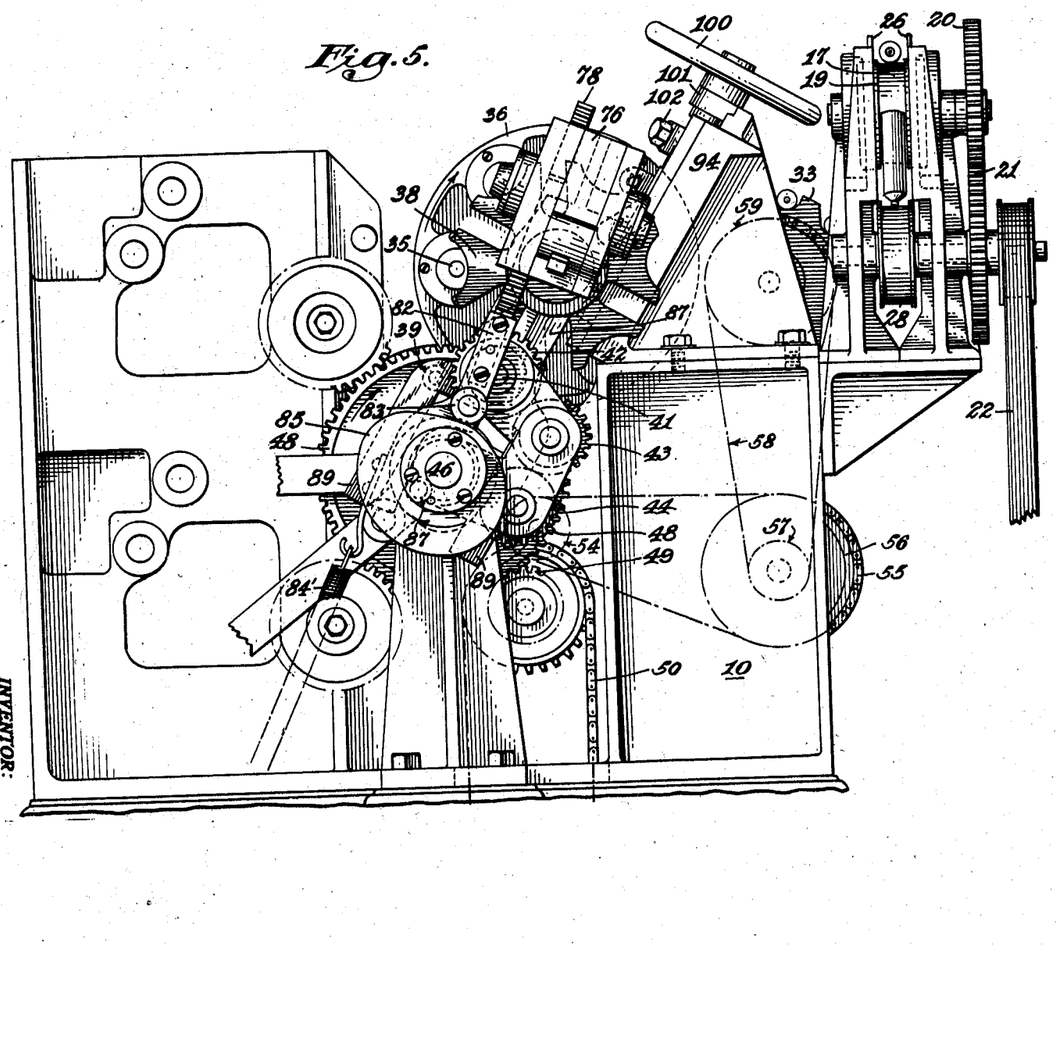
Fig. 5 is a rear elevational view of the printing machine, which is the view represented diagrammatically in Fig. 1.
Figure 6:
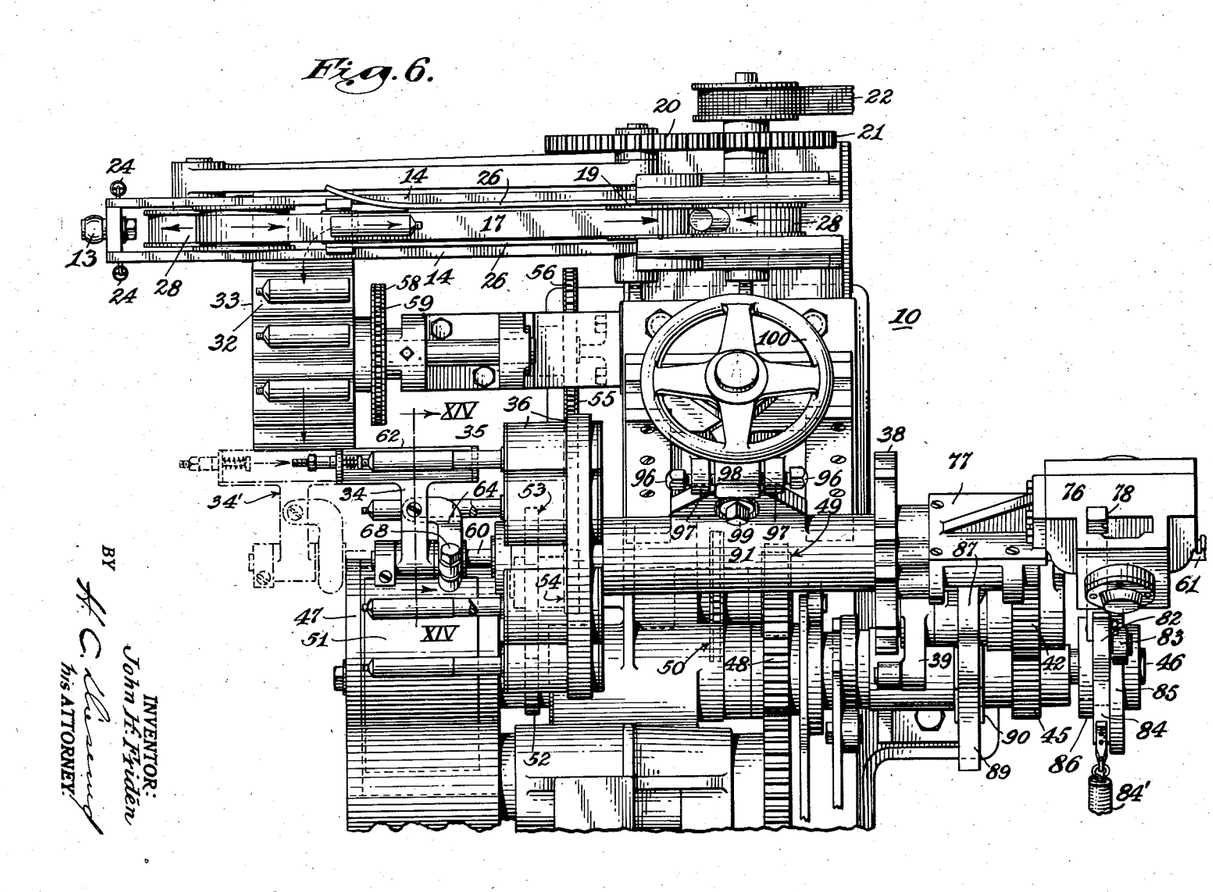
Fig. 6 is a plan view of the machine.
Figure 9:
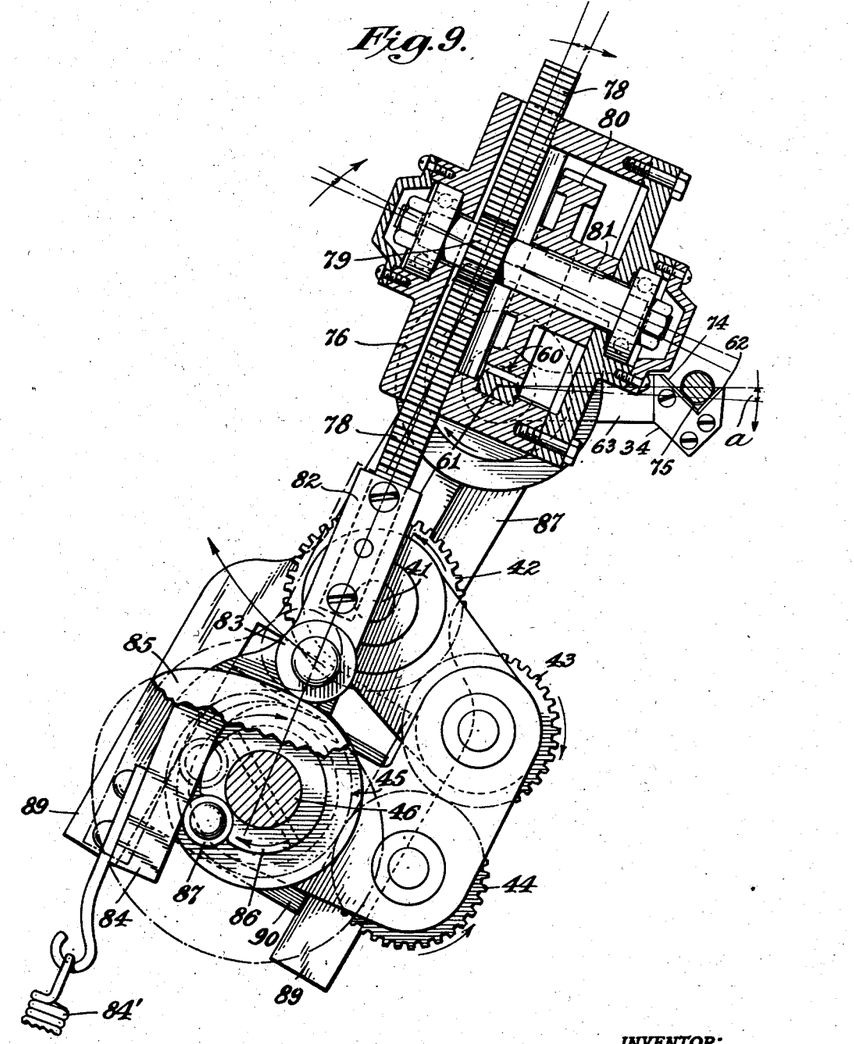
Fig. 9 is a transverse sectional view of mechanism for reciprocating the carriage which applies the coated tubes to the spindles and for effecting rocking of the carriage about the axis of the spindle-supporting turret. This section is represented to an enlarged scale and is taken as indicated on the line IX—IX of Fig. 4.

I shall now describe the mechanism for controlling the movements of the carriage 34. This mechanism is shown in Figs. 4, 5 and 6 and in greater detail in Fig. 9. It consists generally of a housing 76 secured to a bracket 77 which is rotatably mounted with respect to the axis of the rod 60. The rack 61 formed on the squared end of the rod 60 extends through the housing 76. Also extending through the housing 76 but in a direction normal to that of the rack 61 is a second rack 78. Motions imparted to the second rack 78 by means which will be described later are transmitted to the first rack 61 through a pinion 79 meshing with the rack 78 and a gear 80 engaging the rack 61, the pinion 79 and gear 80 being keyed to a common shaft 81 secured in bearings in the housing 76. Secured to the lower end of the rack 78 is an arm 82 at one side of which is mounted a cam roller 83. The arm 82 has an offset shoe 84 the lower end of which is resiliently attached to a fixed portion of the machine by means of a spring 84'. Fixed to the shaft 46 is a cam 85 for engagement with the cam roller 83, and a collar 86 carrying a roller 87 for engagement with the offset shoe 84 of the arm 82. The cam 85 and roller 83 cooperate to effect vertical movement of the rack 78 against the action of spring 84', and the roller 83 coperates with the offset shoe 84 to effect oscillation of the rack 78 and housing 76 about the axis of the rod 60, also against the action of spring 84'. The first of these motions at properly timed intervals causes the carriage 34 to move parallel to the axis of the spindles 35 from the position indicated in dot-dash lines 34' in Fig. 6 to the position indicated in full lines in that figure and back again. The second of these motions at properly timed intervals causes the carriage 34 to rock about the axis of the turret 36 from the position shown in Fig. 14 through the short distance represented at $a$ in that figure so as to lower the trough 62 sufficiently to free it from contact with a tube which has just been applied to one of the spindles 35. The sequence of these movements is as follows: Starting with the carriage 34 in the position shown by the dot-dash lines 34' in Fig. 6 a tube is dropped into the trough 62 on the carriage by the feed wheel 33. At this moment the adapter arm 64 will be in the position shown in Fig. 14 but the arm 63, by reason of the action of the compression spring 66 will be slightly above the position shown in that figure. The carriage 34 then advances toward the full line position shown in Fig. 6, during which travel the inclined surface 75 of the shoulder 74 comes into contact with the spindle 35 causing the arm 63 to move downwardly against the action of the spring 66 into the position shown in Fig. 14 where the trough 62 just clears the spindle 35 by an amount approximately equal to the thickness of the tube carried by the trough. After the carriage 34 reaches the position shown in full lines in Fig. 6 the adapter arm 64 rotates in a counterclockwise direction as viewed in Fig. 14 carrying with it the arm 63 which, after the adapter arm 64 has preceded it by an amount sufficient to separate the arms 63 and 64 the maximum amount permitted by the bolt 65, will then move through the distance represented at $a$ freeing the trough 62 from the tube. The carriage 34 then moves in a longitudinal direction back into position shown in dot-dash lines 34' in Fig. 6.

If desired, the movements of the carriage 34 may be restricted to reciprocation parallel to the axis of the spindles 35 from the position indicated in dot-dash lines 34' in Fig. 6 to the position indicated in full lines in that figure and back again, eliminating the rocking of the carriage about the axis of the turret 36. In this case, the cam roller 87 could simply be omitted, and movement of the rack 78 thus restricted to the up and down reciprocation produced by the interaction of the cam roller 83 and cam 85. When rocking of the carriage is eliminated it is desirable to provide each spindle with a bevelled end 27 and to adjust the carriage arm 63 into a position in which the initial clearance between the trough 62 and spindle 35 is slightly greater than the wall thickness of the tube which is being applied. With this adjustment, movement of the carriage toward the turret 36 in a direction parallel to the axis of the spindle 35 brings the tube into a position in which its top edge rides up on the bevel 27, lifting the tube clear of the trough as it slides onto the spindle, the bevel 27 being of such form and extent as to produce a proper camming action on the end of the tube. Thus when the carriage is being returned to its initial position, it will not rub against the surface of the tube, and scratching or marring of the coating is prevented. It will be understood that if the movements of the carriage 34 are to be restricted to reciprocation in the manner just described, the mechanism may be simplified, as may be desired when provision of means for rocking of the carriage is not required.

The bracket 77 which carries the housing 76 is provided with a downwardly extending arm 87 provided with a boss 88 (Fig. 4) in which is journaled the shaft 41, forming a part of the Geneva wheel driving mechanism previously described. The arm 87 extends beyond the boss 88 and at its lower extremity is bifurcated as at 89. The bifurcations 89 slidably engage a block 90 which is rotatably mounted on the shaft 46 by means of anti-friction bearings. Thus the arm 87 serves at all times to maintain alignment between the shafts 37, 41, 46 while permitting lateral adjustment between the shafts 37 and 46 during which adjustment the movement between the shafts 41 and 46 is permitted by links of the gear-train 42, 43, 44.

Figure 7:
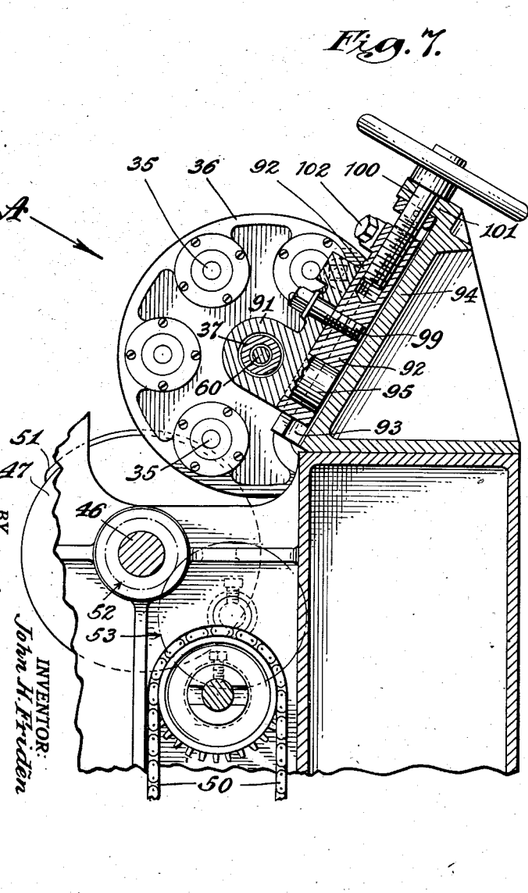
Figs. 7 and 8 illustrate the mechanism for adjusting the alignment of the printing machine spindles with the surface of an impression blanket on the printing roll, Fig. 7 being a fragmentary vertical sectional view taken on the line VII—VII of Fig. 4, and Fig. 8 being an elevational view taken as viewed in the direction of the arrow A shown in Fig. 7.
Figure 8:
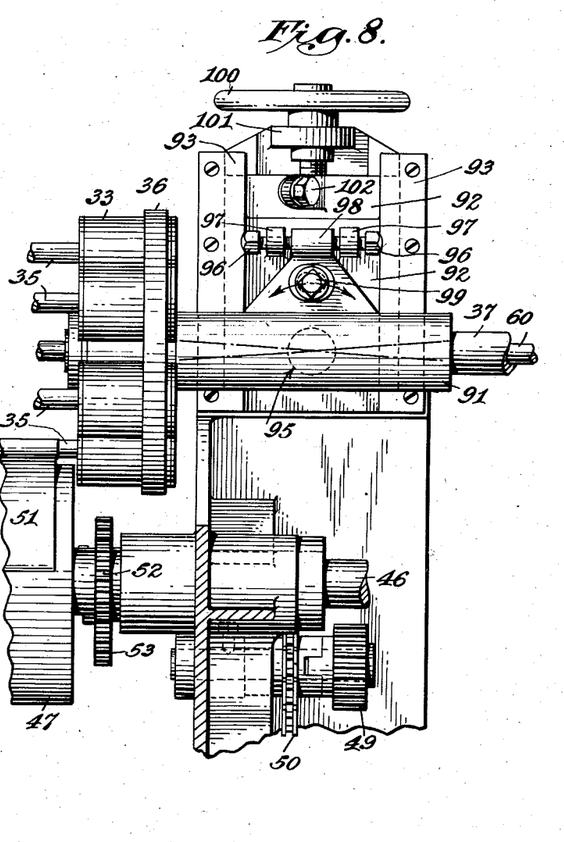

In Figs. 7 and 8 are illustrated the means which I have devised for adjusting the alignment between the axes of the spindles 35 and the surface of the impression blanket 51 on the printing roller 47. The hollow shaft 37 to which the turret 36 is keyed, as previously described, is journaled within a cylindrical bearing member 91 which is mounted on a plate 92 slidably arranged in ways 93 formed in a supporting frame member 94 secured to the main frame of the machine. The hollow bearing member 91 is provided with a trunnion 95 having a pivotal engagement with the slidable plate 92. The pivotal movement of the bearing member 91 with respect to the plate 92 is controlled by opposed set screws 96 extending through projections 97 integral with the plate 92 and bearing against the extension 98 integral with the bearing member 91. A cap screw 99 passing through a slot in the extension 98 which is tapped into the plate 92 provides means for locking the bearing member 91 in position after its axial alignment has been adjusted by means of the aforesaid set screws 96. Lateral adjustment between the shaft 46 and the cylindrical bearing member 91 is provided by the hand screw 100 which extends through a boss 101 formed on the frame member 94. The hand screw 100 provides means for moving the plate 92 along the ways 93, and a cap screw 102 provides means for locking the plate 92 in its adjusted relation to the frame member 94. The pivotal adjustment provided by the set screws 96 and associated mechanism together with the lateral adjustment provided by the hand screw 100 provide means for adjusting the axis of the turret bearing 91 to bring the axes of the spindles 35 into parallelism with the impression blanket 51 carried by the printing roll 47 while preserving the alignment between the axes of the spindles 35 and the axis of the rod 60 about which the carriage 34 pivots.

The intermittently counterclockwise rotation of the turret 36 (Fig. 3) carries a tube applied by the carriage 34 to a position opposite the printing roll 47 at the second station beyond the point of application of the tube to the spindle 35. With a turret carrying six spindles, as shown, a spindle carrying a printed tube thus passes through three stations at the top of the machine before being returned to the station at which the next tube is to be applied. During the interval of travel of the spindle through these three stations the printed tubes are removed by the operator and placed upon the pins 103 of the conveyor chain 2. When the printing unit comprises two stations, as in the embodiment illustrated, the printed tubes are placed on every other one of the pins 103 of the conveyor chain 2 at one station, and the printed tubes from the second station are applied to the remaining pins.

The terms and expressions which I have employed are used as terms of description and not of limitation, and I have no intention by the use of such terms and expressions of excluding any equivalents or minor variations of the invention described.

The subject matter disclosed but not claimed herein, is claimed in my copending application Serial No. 410,494, filed September 12, 1941.

What I claim is:

1. In apparatus for the manufacture of decorated collapsible metal tubes, a series of multiple station processing units, a dryer, a conveyor chain running successively past each station of one unit, through said dryer and therebeyond past each station of another unit, said conveyor chain provided with a series of projections to receive and position tubes during their travel from station to station and unit to dryer to unit, and automatic means for selectively removing tubes from said projections at each station of one of said units positioned beyond said dryer.

2. In apparatus for the manufacture of decorated collapsible metal tubes, a series of multiple station processing units, a conveyor chain running successively past each station of one unit and therebeyond past each station of another unit, said conveyor chain provided with a series of projections to receive and position tubes during their travel from station to station and unit to unit, and automatic means for selectively removing tubes from said projections at each station of a given one of said units whereby tubes conveyed from one station of a preceding unit are removed from the conveyor at one station of said given unit and tubes conveyed from another station of the preceding unit are removed at another station of said given unit.

3. In apparatus for the manufacture of decorated collapsible metal tubes, a series of multiple station processing units, a conveyor chain running successively past each station of one unit and therebeyond past each station of another unit, said chain provided with a series of projections adapted to support tubes placed thereover, a conveyor belt associated with each station of one of said units and having a portion thereof positioned below the path of travel of the projections of the chain and arranged to move in a direction parallel to the axis of the projections, cam means associated with each of said belts to raise and lower at predetermined intervals that portion of each belt which is positioned below said path of travel of said projections, each belt when in raised position being adapted to remove a tube from the chain projection thereabove but when in lowered position to leave a tube on the chain projection thereabove.

4. In apparatus for the manufacture of decorated collapsible metal tubes, a conveyor chain provided with a series of projections adapted to support tubes placed thereover, a chain sprocket, said chain arranged to pass around said sprocket, a cam arranged to rotate with said sprocket, a conveyor belt having a portion thereof positioned below the path of travel of the projections of the chain and arranged to move in a direction parallel to the axis of the projections, means associated with said belt comprising an element cooperating with said cam to raise and lower at predetermined intervals that portion of the belt which is positioned below said path of travel of said projections, the belt when in raised position being adapted to remove a tube from the chain projection thereabove but when in lowered position to leave a tube on the chain projection thereabove.

5. In apparatus for the manufacture of decorated collapsible metal tubes, a series of multiple station processing units, a dryer, a conveyor chain running successively past each station of one unit, through said dryer and therebeyond past each station of another unit, said conveyor chain provided with supporting means to receive and position tubes during their travel from station to station and unit to dryer to unit, and means for selectively removing tubes from said supporting means at each station of one of said units positioned beyond said dryer.

6. In apparatus for the manufacture of decorated collapsible metal tubes, a series of multiple station processing units, a conveyor chain running successively past each station of one unit and therebeyond past each station of another unit, said conveyor chain provided with supporting means to receive and position tubes during their travel from station to station and unit to unit, and automatic means for selectively removing tubes from said supporting means at each station of a given one of said units whereby tubes conveyed from one station of a preceding unit are removed from the conveyor at one station of said given unit and tubes conveyed from another station of the preceding unit are removed at another station of said given unit.

7. In apparatus for the manufacture of decorated collapsible metal tubes, a series of multiple station processing units, a conveyor chain running successively past each station of one unit and therebeyond past each station of another unit, said chain provided with means for supporting tubes with a portion of their lower surfaces exposed, a conveyor belt associated with each station of one of said units and having a portion thereof positioned below the path of travel of the tubes and arranged to move in a direction parallel to the length of the tubes, cam means associated with each of said belts to raise and lower at predetermined intervals that portion of each belt which is positioned below said path of travel, each belt when in raised position being adapted to bear against the lower exposed surface of a tube to remove it from the chain but when in lowered position to leave a clearance between the upper surface of the belt and a tube carried by the chain, the timing of said cams being adjustable to effect removal of alternate tubes at each station of the unit.

8. In apparatus for the manufacture of decorated collapsible metal tubes, a series of multiple station processing units, a dryer, a conveyor chain running successively past each station of one unit, through said dryer, and therebeyond past each station of another unit, said chain provided with means for supporting tubes with a portion of their lower surfaces exposed, a conveyor belt associated with each station of one of said units beyond said dryer and having a portion thereof positioned below the path of travel of the tubes and arranged to move in a direction parallel to the length of the tubes, cam means associated with each of said belts to raise and lower at predetermined intervals that portion of each belt which is positioned below said path of travel, each belt when in raised position being adapted to bear against the lower exposed surface of a tube to remove it from the chain but when in lowered position to leave a clearance between the upper surface of the belt and a tube carried by the chain, the timing of said cams being adjustable to effect removal of alternate tubes at each station of the unit.

9. In apparatus for the manufacture of decorated collapsible metal tubes, a conveyor chain provided with means for supporting tubes with a portion of their lower surfaces exposed, a chain sprocket, said chain arranged to pass around said sprocket, a cam arranged to rotate with said sprocket, a conveyor belt having a portion thereof positioned below the path of travel of the tubes and arranged to move in a direction parallel to the length of the tubes, means associated with said belt comprising an element cooperating with said cam to raise and lower at predetermined intervals that portion of the belt which is positioned below the said path of travel, the belt when in raised position being adapted to contact the exposed lower portion of a tube carried by said chain to remove it therefrom but when in lowered position to leave a clearance between the upper surface of the belt and a tube on the chain.

10. In apparatus for the manufacture of decorated collapsible metal tubes, a conveyor chain provided with means for supporting tubes with a portion of their lower surfaces exposed, a chain sprocket, said chain arranged to pass around said sprocket, a cam arranged to rotate with said sprocket, a conveyor belt having a portion thereof positioned below the path of travel of the tubes and arranged to move in a direction parallel to the length of the tubes, means associated with said belt comprising an element cooperating with said cam to raise and lower at predetermining intervals that portion of the belt which is positioned below the said path of travel, the belt when in raised position being adapted to contact the exposed lower portion of a tube carried by said chain to remove it therefrom, a second conveyor belt positioned below the first and arranged to move in the opposite direction, said second belt extending beyond the end of the first so that tubes removed from said chain by the first belt will be carried over the end thereof and fall onto the second belt to be carried in reversed position and direction thereby.

11. In apparatus for the manufacture of decorated collapsible metal tubes, a series of multiple station processing units, a conveyor chain running successively past each station of one unit and therebeyond past each station of another unit, said conveyor chain provided with a series of projections to receive and position tubes during their travel from station to station and unit to unit, and independently actuated means at each station of a given one of said units for selectively removing tubes from said projections, each of said means comprising a conveyor belt, and means cooperating with said removing means for reversing the position and direction of travel of said tubes at each said station, said conveyor belt forming a part of said last-named means.

12. In apparatus for the manufacture of decorated collapsible metal tubes, a series of multiple station processing units, a dryer, a conveyor chain running successively past each station of one unit, through said dryer and therebeyond past each station of another unit, said conveyor chain provided with a series of projections to receive and position tubes during their travel from unit to dryer to unit, each station of one of said units preceding said dryer comprising means for coloring tubes and each station of one of said units beyond said dryer comprising means for printing the colored and dried tubes, and means associated with each station of the printing unit for selectively removing tubes from said projections, said selective removing means comprising a belt which also forms a part of means for reversing the position of the tubes.

13. In apparatus for the manufacture of decorated collapsible metal tubes, a conveyor chain provided with a series of projections for supporting coated tubes with a portion of their lower surfaces exposed, a conveyor belt having a portion thereof positioned below the path of travel of the tubes and arranged to move in a direction parallel to the length of the tubes, means for raising and lowering at predetermined intervals that portion of the belt which is positioned below said path of travel, the belt when in raised position being adapted to contact the exposed lower portion of a tube carried by said chain to remove it therefrom, means for reversing the coated tubes, a tube-supporting spindle, and means for applying the coated tubes to said spindle, said belt forming a part of the reversing means, said reversing means comprising a second belt positioned below the first, and said second belt comprising a part of the tube-applying means.

JOHN H. FRIDÉN.